(12) United States Patent
McDonald et al.

(10) Patent No.: US 9,248,620 B2
(45) Date of Patent: Feb. 2, 2016

(54) BALER FOR RECYCLED MATERIALS

(71) Applicant: Catawba Baler & Equipment, LLC, Burlington, NC (US)

(72) Inventors: Mark McDonald, Greensboro, NC (US); Mark Piotrowski, Franklinville, NC (US); Kevin Burt, Catawba, NC (US)

(73) Assignee: Catawba Baler & Equipment, LLC, Burlington, NC (US)

( * ) Notice: Subject to any disclaimer, the term of this patent is extended or adjusted under 35 U.S.C. 154(b) by 0 days.

(21) Appl. No.: 14/698,602

(22) Filed: Apr. 28, 2015

(65) Prior Publication Data

US 2015/0231846 A1    Aug. 20, 2015

Related U.S. Application Data

(63) Continuation of application No. PCT/US2015/013000, filed on Jan. 27, 2015.

(60) Provisional application No. 61/931,968, filed on Jan. 27, 2014.

(51) Int. Cl.
*B30B 9/30* (2006.01)
*F16P 3/10* (2006.01)
*B30B 15/30* (2006.01)

(52) U.S. Cl.
CPC ............. *B30B 9/301* (2013.01); *B30B 9/3032* (2013.01); *B30B 9/3057* (2013.01); *B30B 15/30* (2013.01); *F16P 3/10* (2013.01)

(58) Field of Classification Search
CPC ...... B30B 9/30; B30B 9/3014; B30B 9/3003; B30B 9/3092; B30B 9/3021; B30B 15/30; B30B 9/3057; B30B 9/3032; F16P 3/10
USPC ................. 100/215, 218, 226, 232, 240, 245
See application file for complete search history.

(56) References Cited

U.S. PATENT DOCUMENTS 3,762,310 A * 10/1973 Wright .................... B65B 13/20
                                                                  100/3
4,132,042 A *  1/1979 Di Maio .................. E06B 3/485
                                                                  428/116

(Continued)

FOREIGN PATENT DOCUMENTS

| EP | 0508753 A2 | 10/1992 |
| EP | 0536781 A2 | 4/1993 |
| RU | 15195 | 9/2000 |

OTHER PUBLICATIONS

Translation of Otkrytoe (RU15195U1), Sep. 27, 2000.*

(Continued)

*Primary Examiner* — Alexander P Taousakis
*Assistant Examiner* — Onekki Jolly
(74) *Attorney, Agent, or Firm* — NK Patent Law, PLLC (57) ABSTRACT

Baler devices, systems, and methods are shown and described. In one embodiment, the device includes an access door that is generally repositionable about a maintenance opening in a compression chamber. A chamber maintenance assembly may include a repositionable chamber access door, a pair of opposing hydraulic actuators, and a pair of extension arms connecting the access door and the hydraulic actuators. The result is devices, systems, and methods to provide improved access to the compression chamber to attend to jamming maintenance.

20 Claims, 6 Drawing Sheets

(56) References Cited

U.S. PATENT DOCUMENTS

| | | | | |
|---|---|---|---|---|
| 5,007,337 A | * | 4/1991 | Newsom | B30B 9/3014 100/14 |
| 5,201,266 A | * | 4/1993 | Schmalz | B30B 9/30 100/218 |
| 5,203,261 A | * | 4/1993 | Davis | B30B 9/3078 100/215 |
| 5,463,944 A | | 11/1995 | Wolf et al. | |
| 5,558,014 A | * | 9/1996 | Robinson | B30B 9/3014 100/218 |
| 7,493,854 B2 | * | 2/2009 | Etherton | B30B 9/3007 100/240 |
| 7,814,826 B2 | * | 10/2010 | Ribas-Blanes | B30B 9/3003 100/126 |

OTHER PUBLICATIONS

PCT Search Report mailed Jun. 4, 2015 for international application No. PCT/US2015/013000.

* cited by examiner

BALER FOR RECYCLED MATERIALS

CROSS REFERENCE TO RELATED APPLICATIONS

This application is a continuation of PCT Application No. PCT/US15/13000 filed Jan. 27, 2015, which claims the benefit of U.S. Provisional Application No. 61/931,968 filed Jan. 27, 2014, both of which are incorporated herein by reference in their entirety.

TECHNICAL FIELD

The present disclosure relates generally to balers, and more particularly to improved devices, systems, and methods for access to compression chambers.

BACKGROUND

Balers are used to bale compressible materials, for instance waste and the like, into compact units for subsequent discarding and/or recycling. The baled units are traditionally wrapped with a tie down, wire, or the like after the materials reach a sufficient degree of compression. Industrial balers are often bulky devices that require a significant footprint in the warehouse, etc. for baling metal, plastic, and/or paper materials, particularly before transport and/or recycling. These industrial balers are typically made of steel and include at least one ram to traverse material into a chamber and compress the materials therein. In some systems, a shear bar shears off excess material as the ram advances the material into the compression chamber.

One problem associated with baling machines is jamming of materials, for example jamming of the rams, shear bars, or similar internal components. Maintenance of a jamming event requires manual removal of the jammed material from the particular mechanical component inside the chamber(s). Therefore, conventional systems and methods require a manual manipulation of outer chamber components to expose internal components necessary for repair. These traditional systems demand substantial operator effort, as well as require a significant footprint to attend to jamming maintenance.

Applicants desire improved baler devices and systems without the drawbacks presented by traditional systems and methods.

SUMMARY

In accordance with the present disclosure, balers and compression chamber devices and systems are provided for access to internal components of a baler. This disclosure provides improved devices, systems, and methods that are convenient, efficient, and safe for the user, particularly when used to attend to routine maintenance and/or jamming events in industrial balers.

One embodiment of the present disclosure is a baler having a loading chamber, an exit passageway, a compression chamber, and a repositionable chamber access door that is generally repositionable about the compression chamber. The access door typically includes a dual locking system, and further at least one actuator to unidirectionally reposition the chamber access door about the compression chamber. The loading chamber generally receives material and the exit passageway generally discharges baled material from the baler. The compression chamber is positioned between the loading chamber and the exit passageway and has at least one ram to compress material to form a bale.

In some examples, the dual locking system includes an upper top lock latch and at least one bottom locking tongue extending below a lower edge of the access door. The actuator may include a pair of hydraulic cylinders supporting opposing ends of the chamber access door independent of the compression chamber. For instance, each of the hydraulic cylinders may include a piston rod that is generally able to protrude from the cylinder barrel to raise and lower the chamber access door about a single axis. The chamber access door may be vertically repositionable along a single axis between a lowered operating position and an upright maintenance position. Further, a maintenance interface console may be in electrical communication with the actuator and to unidirectionally reposition the access door about the compression chamber, for instance without manual manipulation of the door.

In another embodiment, the disclosure includes a baler with a compression chamber prone to jamming and an opening for access to attend to jamming maintenance. The chamber maintenance assembly includes a repositionable chamber access door having two opposing sidewalls and a lower edge; a pair of opposing hydraulic actuators spaced apart from one another and supporting the chamber access door; and an extension body connecting the sidewalls between the hydraulic actuators. Typically, the lower edge of the access door is recessed into a subfloor during an operating position and raised vertically exposing the chamber access during an upright maintenance position.

In some examples, the chamber access door is vertically repositioned along a single axis between the lowered operating position and the upright maintenance position. The assembly may include a dual locking system having an upper top lock latch and at least one bottom locking tongue extending below a lower edge of the access door. At least one locking beam may engage the chamber access door during the upright maintenance position.

In particular examples, a maintenance interface console may be in electrical communication with the actuator to control a position of the chamber access door about the chamber opening. Further, a pair of opposing hydraulic actuators may unidirectionally reposition the chamber access door about the compression chamber. In addition, lower edge of the chamber door may be substantially parallel with a top of the chamber opening during the maintenance position. Still further, the chamber access door may include an upper edge positioned below the extension body. Yet still further, the chamber access door may include a reinforced honeycomb wall.

Another embodiment of the present disclosure is a chamber maintenance assembly in a baler having a compression chamber with an opening for access to jamming maintenance. The chamber maintenance assembly may include a removable chamber access door, a pair of opposing hydraulic cylinders, and a pair of extension arms. Typically, the removable chamber access door has two opposing sidewalls and a lower edge. The pair of opposing hydraulic cylinders are typically spaced apart from one another and support the chamber access door. The extension body and/or pair of extension arms typically connect sidewalls between the hydraulic cylinders, wherein the sidewalls extend horizontally to, and/or beyond, the maintenance opening. Typically, the lower edge of the chamber access door is recessed into a subfloor during an operating position and raised vertically exposing the chamber access during an upright maintenance position.

In some examples, the chamber access door is vertically repositionable along a single axis between the operating position and the upright maintenance position. The lower edge of the chamber access door may include a flanged corner that is generally adapted to recess into the subfloor during the operation position. The lower edge of the chamber door may be at least parallel with a top of the maintenance opening during the maintenance position. The chamber access door may include an upper edge positioned below the extension body and/or pair of extension arms. In some examples, at least one locking bar adapted to engage the chamber access door during the upright maintenance position.

In other examples, a maintenance console may be electrical communication with the mechanical actuator. The maintenance console may unidirectionally reposition the chamber access door about the compression chamber. The maintenance console may include a touch screen panel. The operation system may include a control panel independent of the bailer control system, wherein the operation system being in electrical communication with the mechanical actuator to control the chamber access door about the compression chamber. The pair of opposing hydraulic cylinders may unidirectionally reposition the chamber access door about the compression chamber.

Another embodiment of the disclosure is a baler having a loading chamber, an exit passageway, and a compression chamber with a removable chamber access door. Typically, the loading chamber generally receives material. The exit passageway is typically adapted to discharge material from the baler. The compression chamber is typically positioned between the loading chamber and the exit passageway and is generally adapted for forming a bale of the material compressed in the compression chamber. The removable chamber access door may be offset outside of the compression chamber and may have at least one actuator to unidirectionally reposition the chamber access door about the compression chamber.

In some examples, the actuator includes a pair of hydraulic actuators supporting opposing ends of the access door independent of the compression chamber. The hydraulic cylinders may include a cylinder barrel positioned external of the compression chamber. The hydraulic cylinders may include a piston rod protruding from the cylinder barrel and adapted to raise and lower the chamber access door about a single axis. Each of the hydraulic cylinders may include a cylinder cap secured to a bottom surface.

In other examples, the chamber access door includes a reinforced honeycomb wall. For instance, the honeycomb wall may include a plurality of vertical protrusions intersecting a plurality of horizontal protrusions, thereby defining the reinforced honeycomb wall. Further, a maintenance console may be in electrical communication with the mechanical actuator and may be generally adapted to unidirectionally reposition the chamber access door about the compression chamber. In addition, the maintenance console may include a touch screen panel independent of a baler operating system.

Yet another embodiment of the disclosure is a baler having a loading chamber, exit passageway, a compression chamber, and a chamber maintenance assembly. Typically, the loading chamber is generally adapted for receiving material. The exit passageway may be generally adapted to discharge material from the baler. The compression chamber may be positioned between the loading chamber and the exit passageway. The compression chamber is typically forms a bale of the material compressed in the compression chamber. The chamber maintenance assembly may be substantially perpendicular to the exit passageway. The chamber maintenance assembly may include a removable chamber, a pair of opposing hydraulic cylinders, and a pair of extension arms. The removable chamber access door may have two sidewalls and a lower edge. The pair of opposing hydraulic cylinders may be spaced apart from one another and support the chamber access door, for instance independent of the compression chamber. The pair of extension body and/or arms may connect the sidewalls between the hydraulic cylinders. Typically, the sidewalls extend horizontally to the access opening. The chamber access door is generally repositionable along a vertical axis between a lowered operating position and an upright maintenance position.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
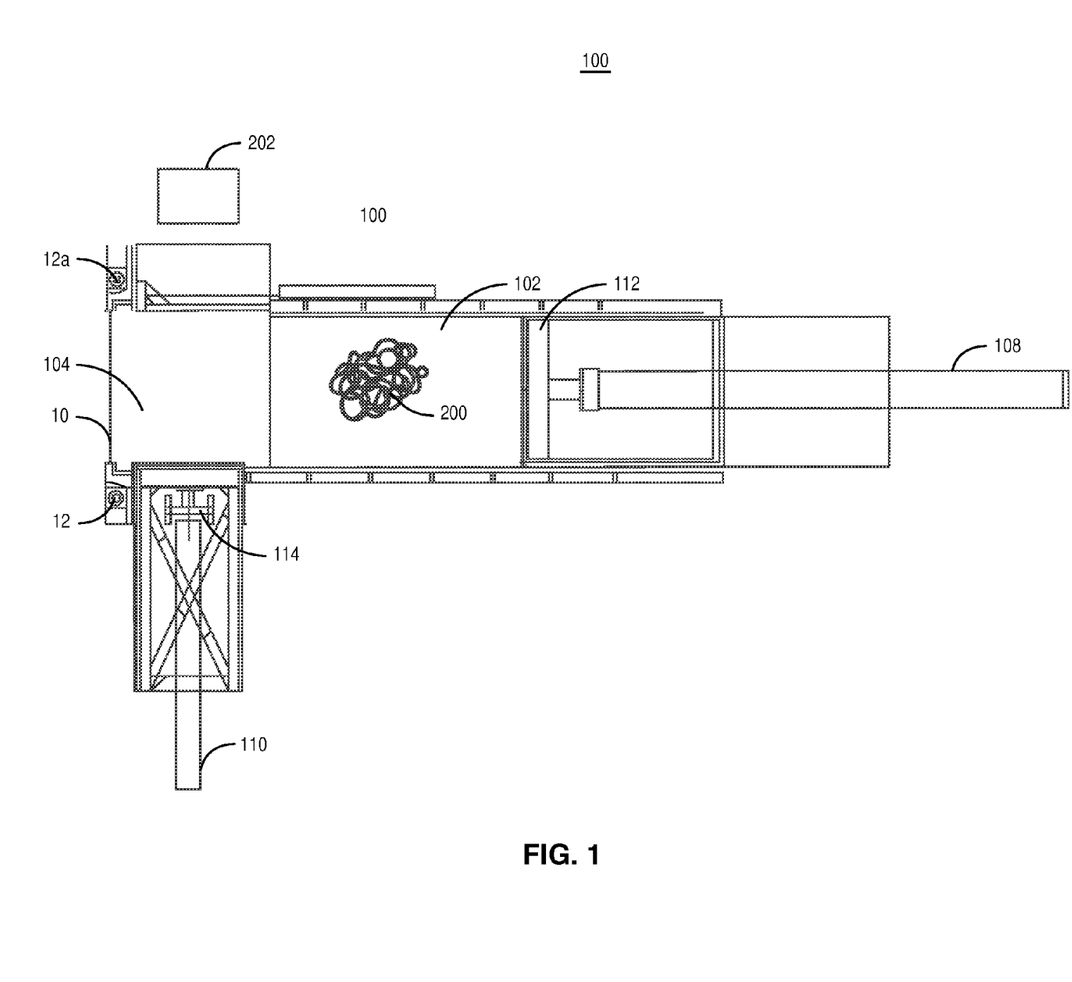
FIG. 1 is a top view of a baler according to an embodiment of the disclosure.
Figure 2A:
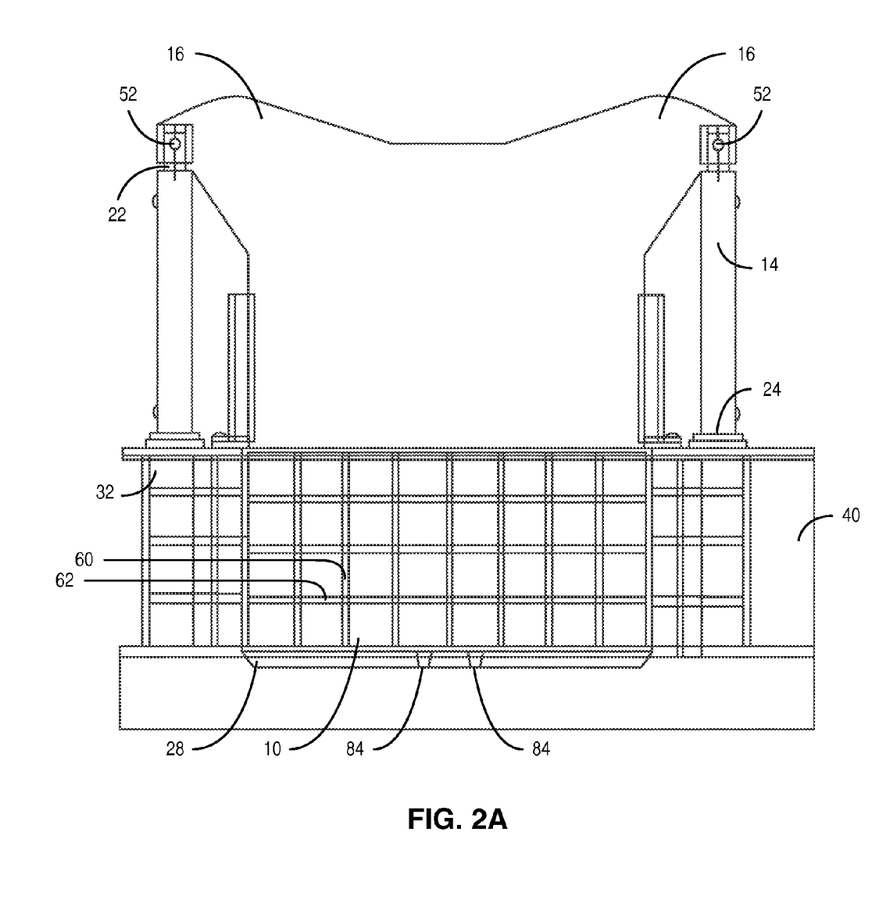
FIG. 2A is a side perspective view of one embodiment of a chamber access door in a closed, operating position.
Figure 2B:
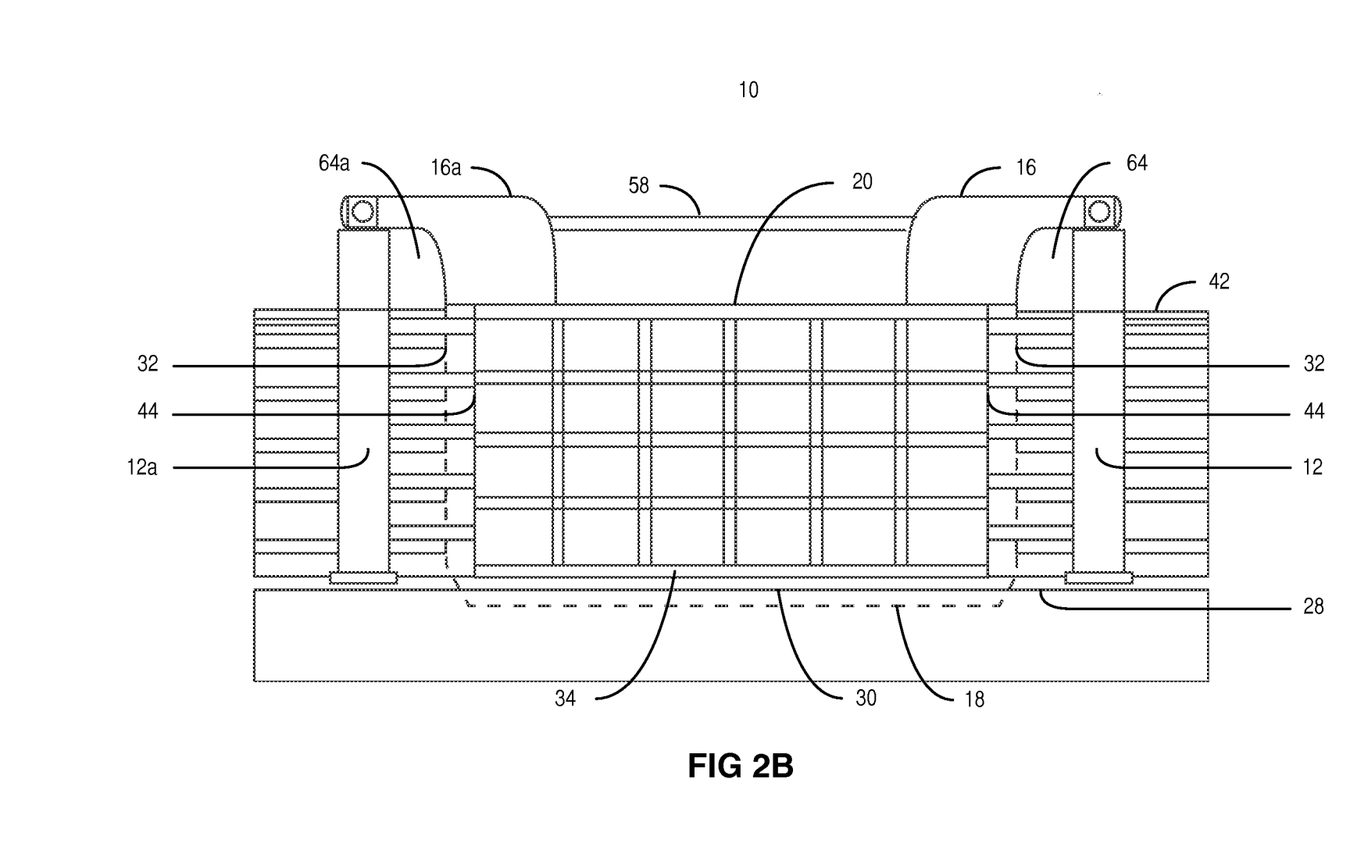
FIG. 2B is a side perspective view of one embodiment of a chamber access door in a closed, operating position.

Referring now to the drawings in general and FIGS. 1 and 2A-2B in particular, it will be understood that the illustrations are for the purpose of describing embodiments of the disclosure and are not intended to limit the disclosure or any invention thereto. As best seen in FIG. 1, a baler 10 is shown embodied according to the present disclosure. The baler 10 typically includes dual rams and a compression chamber 104 to form bales 202 of material 200. The compression chamber 104 includes a removable access door 10 that is unidirectionally repositionable with actuators 12, 12a to provide convenient and efficient maintenance access to the compression chamber 104 to attend to jams and the like. Embodiments of the balers shown and described herein may include a variety of traditional baler components and arrangements, including, without limitation, horizontal baler elements, vertical baler elements, and a combination thereof.

FIG. 1 illustrates one example of a dual ram baler 100 with a loading chamber 102 to generally receive material 200, i.e. waste material, industrial material, recycling material, or the like. The loading chamber 102 may include a compression cylinder 108 having a compression ram 112 to generally traverse and/or compress the material 200 from the loading chamber 102 into the compression chamber. The compression cylinder 108 may be a hydraulic cylinder, while other examples include hydraulic and mechanical systems to traverse and compress material 200 as shown and described herein. In other examples, the baler 100 may include at least one hopper or similar material collection assembly.

As further shown in FIG. 1, the compression chamber 104 is generally adjacent the loading chamber 102. Embodiments of the compression chamber include a variety of horizontal and vertical baler compression chamber components as recognized by those skilled in the art. As shown in FIG. 1, the horizontal baler 100 may include a bale ejection cylinder 110 having an ejection ram 114 to generally eject baled materials 202 from the baler, for instance via an exit passageway. In particular examples, the exit passageway may include a removable exit gate as understood by those skilled in the art.

In a closed, operating position, the repositionable access door is aligned with the compression chamber's maintenance opening to generally define an enclosure for normal bale operation conditions as understood by those skilled in the art. For instance, in the operating position, the baler compresses material into bales. FIGS. 2A and 2B show embodiments of the removable chamber access door 10 in a closed, operating position.

Figure 4:
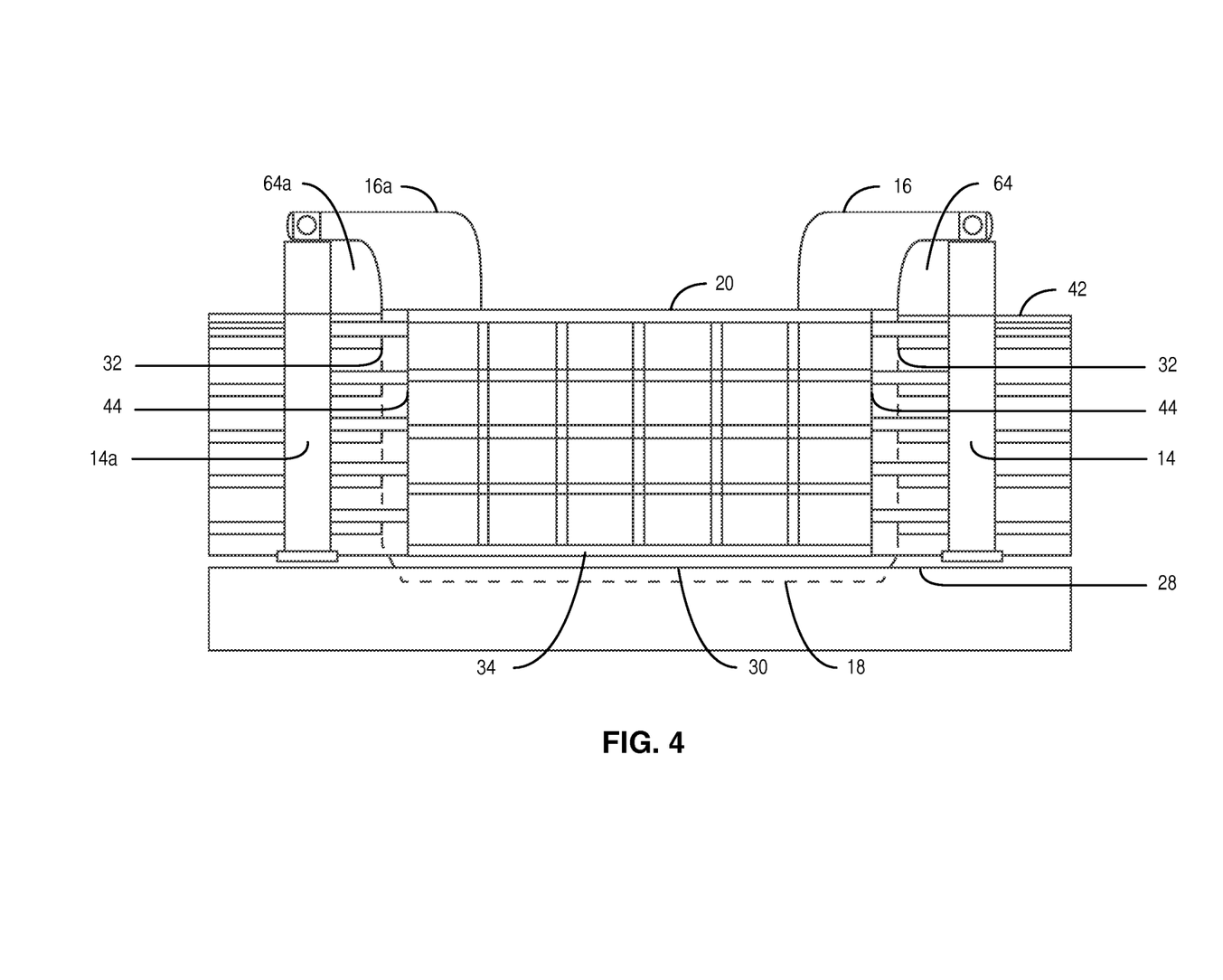
FIG. 4 is a side perspective view of another embodiment of a chamber access door in a closed, operating position.

The chamber access door 10 is a rigid body that is generally aligned outside, i.e. offset, from the compression chamber. Embodiments of the chamber door 10 include a variety of rigid walls, plates, and semi-flat bodies to enclose chamber components and to withstand the operation of the baler, including strength to withstand any compressive forces exerted by the compression chamber 102 during operation. In one example, the chamber door includes a reinforced honeycomb wall having several intersecting horizontal protrusions 62 and vertical protrusions 60. In addition, as shown in FIG. 2, at least one, including two or more, cross bar 58 may span between the opposing extension arms body and/or arms 16, 16a to provide additional strength to the chamber door 10. FIG. 4 introduces another embodiment of the repositionable chamber access door in a closed, operating position without a cross bar.

Returning to FIGS. 2A and 2B, the chamber access door 10 may include an upper edge 20 that is spaced vertically apart from the lower edge 18 to fully enclose any of the compression chamber maintenance openings shown and described herein. The lower edge 18 may rest below the surface in a closed, operating position. Similarly, the sidewalls 32, 32a may be spaced apart from one another to fit snuggly between the edges 44 of the compression chamber. However, in alternative embodiments, the sidewalls 32 may be recessed and moveable in opposing slots in the compression chamber edges 44.

The chamber access door is secured to at least one actuator to vertically reposition the chamber access door about a single axis, i.e. the access door is not pivoted or rotated as required by traditional systems and methods. As shown in FIGS. 2A and 2B, one example of the actuator includes opposing hydraulic actuators 12, 12a positioned on opposite sides of the maintenance access opening.

The chamber access door may be secured to the actuator in a variety of ways to provide the unidirectional movement of the access door about the compression chamber. In one example, the extension body connects the chamber access door 10 to the upper portion of each of the hydraulic actuators 12, 12a. In this example, the extension body are spaced 64, 64a from the compression chamber to provide clearance for the unidirectional movement. Alternative examples include a reverse orientation, i.e. a portion of the door is secured to a lower portion of the actuator to provide a similar unidirectional movement shown and described herein. Further, the distal ends of the extension arms 16, 16a may be secured to the chamber access door 10 in a variety of ways, including welding, mechanical fasteners, and the like. Similarly, the proximate ends of the extension arms 16, 16a may be secured to the actuator(s) in a variety of ways, including welding, mechanical fasteners, and the like.

Typically, the actuator vertically repositions the chamber access door about a single vertical axis. Unexpectantly, the Applicants have discovered the vertical repositioning eliminates the conventional constraints presented by multi-axis and manual manipulation of bulky, troublesome doors. For instance, the isolated vertical movement of the chamber access door requires no additional floor footprint as required in conventional systems. Further, the unidirectional vertical movement of the access door about the compression chamber is automated to reduce, or eliminate, conventional health and safety concerns as recognized by one skilled in the art having the benefit of this disclosure.

Figure 3:
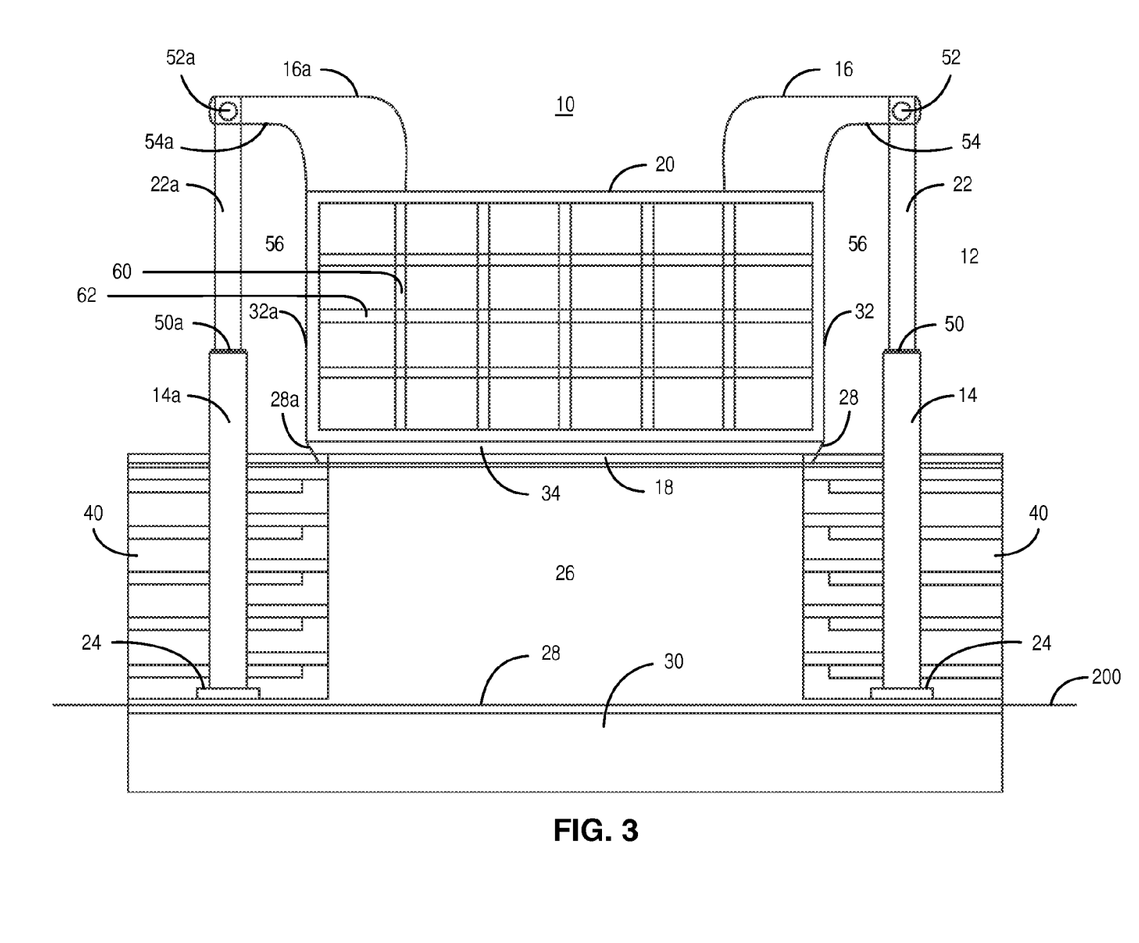
FIG. 3 is a side perspective view of one embodiment of a chamber access door in an open, maintenance position.

In a maintenance position, the actuator vertically lifts the access door from the operating position to expose the chamber opening. FIG. 3 shows one embodiment of the chamber access door 10 lifted vertically from the operating position shown in FIG. 2 to a maintenance position. As shown, each actuator may include a hydraulic piston rod 22, 22a extendable about cylinder barrels 14, 14a. In FIG. 3, the piston rods 22 are extended from the cylinder barrels 14 to expose the chamber opening 26. In addition, the extension body/arms 16, 16a are spaced 56 farther away from the chamber wall 40 than compared to the spacing 64 in the closed, operating position.

In FIG. 3, the lower edge 18 of the access door 10 is aligned substantially parallel with the top of the chamber wall 40. In yet other examples, the lower edge 18 of the access door 10 may be aligned above the top of the chamber wall 40 or the like. A lock-out assembly may secure the access door 10 in the upright maintenance position. For instance, the lock-out assembly may include a locking bar to secure the access door in the upright position during maintenance. In addition, the lock-out assembly may include electrical controls to electrically retain the access door in the upright, maintenance position.

As further shown in FIG. 3, the distal portion of the piston rods 22, 22a are secured to the extension arms 16, 16a at fasteners 52, 52a. In other examples, the extension arms may be secured to the piston rods, or similar attachment unit, with a variety of fasteners, welds, and the like.

The hydraulic actuators 12, 12a may include a lower cylinder barrel base 14, 14a. As shown in FIG. 3, each of the cylinder barrel bases 14, 14a may have a cylinder cap 24, 24a secured to a surface 200. In some examples, the surface 200 is a floor surface, however other examples include a variety of similar base foundations, including portions of the baler, machinery risers, and the like. As further shown in FIG. 2B, a piston rod 22, 22a typically extends from each cylinder barrel base 14, 14a to reposition the access door as shown and described herein. In addition, the lower edge 18 may include tapered corners 28 that generally align with an opening 28 in the subfloor 30.

Figure 5:
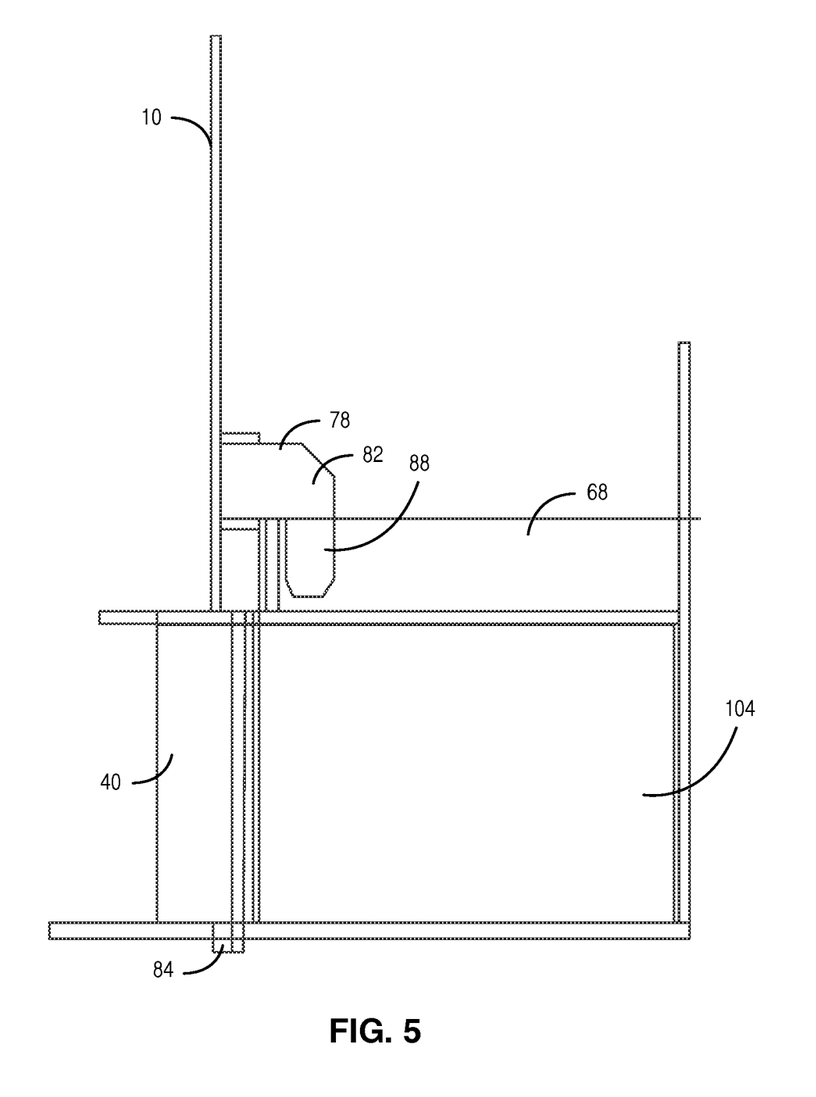
FIG. 5 is an isolated, side perspective view of one embodiment of a chamber access door according to the disclosure.

FIG. 5 is an isolated view of one embodiment of an access door showing one embodiment of a dual locking system to secure the access door, for instance a free jam push button technology door, in any of the semi-fixed positioned shown herein. In certain examples, the dual locking system may include an upper lock and a bottom lock; however, other examples include only an upper lock or a bottom lock. As shown in FIGS. 2A and 5, the door may include a top lock latch 82 and a bottom lock 84. The top lock latch 82 may be aligned along an upper portion of the inner surface of the access door, and may further include a first horizontal portion 78 that is substantially perpendicular to a second vertical portion 88, thereby defining an opening to slip over a locking beam 68. Further, as illustrated in FIG. 2A, the dual locking system may also include at least one, including a pair of opposing or the like, bottom locking tongue(s) 84 protruding through the surface to secure the door in any of the semi-fixed positions shown and described herein.

Any of the access door shown and described herein may include a first, second, third, and fourth sides, the first side (i.e. the upper edge) and the second side (i.e. the lower edge) may oppose one another. Similarly, the third side (i.e. the sidewall) may oppose the fourth side (i.e. the sidewall). The first and second sides may be substantially perpendicular to the third and fourth sides. The third and fourth sides may be offset from assembly with extension body and/or arms.

In use, balers are prone to jamming, for instance when material being processed becomes jammed, or otherwise lodged, along internal components. In particular cases, the material that is being baled may become jammed between the rams, shears, or the like. The jam must be removed by an operator(s) before normal operation of the baler may resume. Therefore, any of the access walls shown and described herein may be positioned over a maintenance opening to provide convenient, efficient access to the inner chambers. The access doors are unidirectionally positionable for improved maintenance access and to reduce the footprint needed for each baler. Those of ordinary skill in the art having the benefit of this disclosure will recognize a variety of operator maintenance interface consoles for automating the access door's orientation about the chamber. Typically, the maintenance interface console is in electrical communication with any of the actuators shown and described herein to unidirectionally reposition the chamber access door without manual effort. In some examples, the maintenance console includes a touch screen panel. Further, the maintenance console may be independent of the baler's operating system.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

The invention claimed is:

1. A baler comprising:
a loading chamber adapted for receiving material;
a normal operation exit passageway adapted to discharge baled material from the baler;
a compression chamber positioned between the loading chamber and the normal operation exit passageway and having at least one compression ram adapted for compressing the material and forming a bale, the chamber further defining a discharge ram for discharging the compressed bale through the normal operation exit passageway; and
a chamber access door repositionable about the compression chamber, the access door having at least one actuator to reposition the chamber access door about the compression chamber between a bottom position where the access door forms a portion of a wall of the compression chamber and an elevated position when translated by the at least one actuator where the displaced wall defines a jam exit passageway such that jammed material can be translated through the jam exit passageway by the compression ram.

2. The baler of claim 1, wherein the access door includes a dual locking system that includes an upper lock latch and at least one bottom locking tongue extending below a lower edge of the access door.

3. The baler of claim 1, wherein the at least one actuator includes a pair of hydraulic cylinders supporting opposing ends of the chamber access door independent of the compression chamber.

4. The baler of claim 3, wherein each of the hydraulic cylinders includes a piston rod protruding from the cylinder barrel, and adapted to raise and lower the chamber access door about a single axis.

5. The baler of claim 4, wherein the chamber access door is vertically repositionable along a single axis between a lowered operating position and an upright maintenance position.

6. The baler of claim 1, including a maintenance interface console in electrical communication with the actuator and adapted to unidirectionally reposition the access door about the compression chamber without manual manipulation of the door.

7. The baler of claim 5, wherein the lower edge of the chamber door is substantially parallel with a top of the chamber opening during the maintenance position.

8. The baler of claim 1, wherein the chamber access door includes an upper edge positioned below an extension body connecting the access door to the at least one actuator.

9. The baler of claim 1, wherein the chamber access door includes a reinforced honeycomb wall.

10. In a baler having a compression chamber prone to jamming and an opening for access to attend to jamming maintenance, the baler comprising:
a repositionable chamber access door having two opposing sidewalls and a lower edge, the access door being aligned to face a ram that compresses material into a baled material within the compression chamber;
an actuator supporting the chamber access door; and
an extension body connecting the sidewalls between the actuator, and
wherein the access door is raised vertically exposing the chamber access during an upright maintenance position to define a jam exit passageway for translating jammed material therethrough with the ram,
wherein the chamber access door includes an upper edge positioned below an extension body connecting the access door to the actuator.

11. The baler of claim 10, wherein the chamber access door being vertically repositioned along a single axis between a lowered operating position and the upright maintenance position.

12. The baler of claim 10, including a dual locking system having an upper lock latch and at least one bottom locking tongue extending below the lower edge of the access door.

13. The baler of claim 10, including at least one locking beam adapted to engage the chamber access door during the upright maintenance position.

14. The baler of claim 10, including a maintenance interface console in electrical communication with the actuator and adapted to control a position of the chamber access door about the chamber opening consisting essentially of a lowered operating position and an upright maintenance position.

15. The baler of claim 10, wherein the actuator includes a pair of opposing hydraulic actuators unidirectionally repositions the chamber access door about the compression chamber.

16. The baler of claim 10, wherein the lower edge of the chamber door is substantially parallel with a top of the chamber opening during the maintenance position.

17. The baler of claim 10, wherein the chamber access door includes a reinforced honeycomb wall.

18. A baler comprising:
   a loading chamber for loading materials to be compressed; and
   a compression chamber in communication with the loading chamber, wherein the materials are translated from the loading chamber and compressed into the compression chamber by a compression rod extending from the loading chamber;
   wherein a normal operation exit passageway is defined about the compression chamber and a discharge ram translates compressed material through the normal operation exit passageway when the baler is free of a jam,
   wherein a chamber access door defines a first position where the door forms a portion of the compression chamber and a second position where the door is spaced-apart from the compression chamber to form a jam exit passageway, wherein the compression rod is configured to translate jammed material through the jam exit passageway.

19. The baler of claim 18, further including an actuator for moving the chamber access door between the first position and the second position.

20. The baler of claim 18, wherein the chamber access door includes a reinforced honeycomb wall.

\* \* \* \* \*